United States Patent
Kikuchi et al.

(10) Patent No.: US 12,275,812 B2
(45) Date of Patent: Apr. 15, 2025

(54) OLEFIN RESIN, CROSSLINKED PRODUCT THEREOF, AND PRODUCTION METHODS THEREOF

(71) Applicant: MITSUI CHEMICALS, INC., Tokyo (JP)

(72) Inventors: Seiya Kikuchi, Chiba (JP); Yasushi Yanagimoto, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 764 days.

(21) Appl. No.: 17/437,806

(22) PCT Filed: Mar. 6, 2020

(86) PCT No.: PCT/JP2020/009626
§ 371 (c)(1),
(2) Date: Sep. 9, 2021

(87) PCT Pub. No.: WO2020/184421
PCT Pub. Date: Sep. 17, 2020

(65) Prior Publication Data
US 2022/0162369 A1    May 26, 2022

(30) Foreign Application Priority Data

Mar. 12, 2019  (JP) ................. 2019-044850

(51) Int. Cl.
| | | |
|---|---|---|
| C08F 290/04 | (2006.01) | |
| C08F 4/659 | (2006.01) | |
| C08F 210/06 | (2006.01) | |
| C08F 210/16 | (2006.01) | |
| C08F 236/20 | (2006.01) | |
| C08F 255/04 | (2006.01) | |

(52) U.S. Cl.
CPC ...... *C08F 290/042* (2013.01); *C08F 4/65908* (2013.01); *C08F 4/65912* (2013.01); *C08F 210/06* (2013.01); *C08F 210/16* (2013.01); *C08F 236/20* (2013.01); *C08F 255/04* (2013.01); *C08F 2500/02* (2013.01)

(58) Field of Classification Search
None
See application file for complete search history.

(56) References Cited

U.S. PATENT DOCUMENTS

| 5,616,153 A | 4/1997 | Mike et al. |
|---|---|---|
| 2010/0004393 A1* | 1/2010 | Ikenaga ................. C08L 23/04 526/281 |
| 2017/0081509 A1* | 3/2017 | Itakura .................... C08L 23/16 |

FOREIGN PATENT DOCUMENTS

| JP | H09-169820 A | 6/1997 |
|---|---|---|
| JP | 2004-091640 A | 3/2004 |
| JP | 2017-025233 A | 2/2017 |
| JP | 2017-025234 A | 2/2017 |
| JP | 2018-035267 A | 3/2018 |
| WO | WO-2009/155510 A2 | 12/2009 |

OTHER PUBLICATIONS

Altay, et al., "Mesoporous Polymer Frameworks from End-Reactive Bottlebrush Copolymers", ASC Nano, 2017, vol. 11, pp. 8207-8214.
Vatankhah-Varnosfaderani, et al., "Mimicking biological stress-strain behaviour with synthetic elastomers", Nature, 2017, vol. 549, pp. 497-501.

* cited by examiner

*Primary Examiner* — Anthony J Frost
(74) *Attorney, Agent, or Firm* — Foley & Lardner LLP

(57) ABSTRACT

The present invention relates to an olefin resin including a copolymer of an olefin macromonomer with a non-conjugated diene.

8 Claims, No Drawings

OLEFIN RESIN, CROSSLINKED PRODUCT THEREOF, AND PRODUCTION METHODS THEREOF

CROSS-REFERENCE TO RELATED APPLICATIONS

The present application claims priority under 37 U.S.C. § 371 to International Patent Application No. PCT/JP2020/009626, filed Mar. 6, 2020, which claims priority to and the benefit of Japanese Patent Application No. 2019-044850, filed Mar. 12, 2019. The contents of these applications are hereby incorporated by reference in their entireties.

TECHNICAL FIELD

The present invention relates to an olefin resin that satisfies specific requirements, a crosslinked product thereof, and production methods thereof.

BACKGROUND ART

Polymer materials with a branched structure have various forms depending on the degree of branching and the branching density. In particular, so-called bottle brush polymers, which are graft polymers in which polymer chains are arranged at high density, exhibit properties different from those of linear polymers, the properties including the extensibility of the main chain, flexibility, and difficulty in entanglement between molecules due to the repulsion between side chains. Thus, attention has been given to the design of the materials using these properties. For example, Non Patent Literature 1 discloses a crosslinked product of an acrylic or silicone bottle brush polymer, and a new possibility thereof as a soft material is shown. Non Patent Literature 2 shows a material that is a crosslinked product of an acrylic bottle brush polymer and has uniform pores, for example.

Meanwhile, olefin resins typified by polyethylene and polypropylene are widely used as car parts such as bumpers and instrument panels, packaging materials, sports parts, and wire coating materials due to their properties such as lightweight, high heat resistance, and chemical resistance, excellent formability, and excellent recyclability. Further, ethylene-α-olefin copolymers have various physical properties such as thermal properties, mechanical properties, and rheological properties that vary depending on the composition of monomers (the composition ratio of ethylene to α-olefin), and thus ethylene-α-olefin copolymers having a monomer composition designed corresponding to the required performance for each application are widely used as compatibilizers and modifiers.

In order to improve the performance of olefin resins such as mechanical properties and formability, attempts to introduce branched chains into polymers have been made. Further, Patent Literature 1 discloses an example of homopolymerization of an olefin polymer having a vinyl group at a terminal by coordination polymerization. Further, Patent Literature 2 discloses a radical polymerization method involving converting a terminally unsaturated group of an ethylene-propylene copolymer into a radically polymerizable group.

However, these related arts do not aim to design bottle brush polymers, and no methodology to actually form crosslinked products of olefin bottle brush polymers has been shown.

CITATION LIST

Patent Literature

Patent Literature 1: WO 2009/155510
Patent Literature 2: JP-A 2004-91640

Non Patent Literature

Non Patent Literature 1: Sheiko, S. Nature 2017, 549, 497-501.
Non Patent Literature 2: Rzayev, J. ASC Nano 2017, 11, 8207-8214.

SUMMARY OF INVENTION

Technical Problem

It is an object of the present invention to provide an olefin resin comprising an olefin bottle brush polymer having a crosslinkable unsaturated carbon bond, a crosslinked product thereof, and further production methods thereof.

Solution to Problem

As a result of dedicated studies, the inventors have achieved the aforementioned object by copolymerizing an olefin macromonomer with a non-conjugated diene in the presence of an olefin polymerization catalyst, thereby accomplishing the present invention.

The present invention relates to [1] to [8] below.
[1] An olefin resin comprising a copolymer of an olefin macromonomer with a non-conjugated diene.
[2] The olefin resin according to [1] above, wherein the copolymer of the olefin macromonomer with the non-conjugated diene has a content of structural units derived from the olefin macromonomer in a range of 80 to 99.5 mol %.
[3] The olefin resin according to [1] or [2] above, wherein the olefin macromonomer satisfies requirements (i) to (iii) below:
(i) the olefin macromonomer is a homopolymer or a copolymer of one or more olefins selected from ethylene and α-olefins having 3 to 12 carbon atoms;
(ii) the olefin macromonomer has a weight-average molecular weight in a range of 1,000 to 30,000; and
(iii) the olefin macromonomer has vinyl groups in an amount of 50 mol % or more with respect to all unsaturated end-groups.
[4] The olefin resin according to [3] above, wherein the requirement (i) is that the olefin macromonomer is a copolymer of ethylene with one or more α-olefins having 3 to 12 carbon atoms, wherein a content of repeating units derived from ethylene is in a range of 30 to 70 mol %.
[5] The olefin resin according to [3] or [4] above, wherein the requirement (iii) is that the olefin macromonomer has vinyl groups in an amount of 60 mol % or more with respect to the all unsaturated end-groups.
[6] A method for producing the olefin resin according to any one of [1] to [5] above, comprising step A and step B below:
step A: a step of producing an olefin macromonomer by polymerizing an olefin in the presence of an olefin polymerization catalyst; and
step B: a step of producing an olefin resin by copolymerizing the olefin macromonomer produced in the step A with a non-conjugated diene in the presence of an olefin polymerization catalyst.

[7] A crosslinked product of the olefin resin according to any one of [1] to [5] above.

[8] A method for producing a crosslinked product, comprising crosslinking an olefin resin obtained by the method according to [6] above using a crosslinking agent.

Advantageous Effects of Invention

The olefin resin of the present invention can provide a crosslinked product with excellent mechanical properties and a precursor thereof, since the olefin resin comprises an olefin bottle brush polymer having a crosslinkable unsaturated carbon bond. Further, the olefin resin of the present invention and a crosslinked product thereof are also excellent in lightweight property, chemical resistance, and recyclability, since they are olefin resins.

DESCRIPTION OF EMBODIMENTS

Hereinafter, the present invention will be specifically described. In the following description, a numerical range shown with the word "to" represents a range from the precedent number to the subsequent number unless otherwise specified.

<Olefin Resin>

The olefin resin of the present invention comprises a copolymer of an olefin macromonomer with a non-conjugated diene.

Hereinafter, the olefin macromonomer and the non-conjugated diene will be described sequentially.

(1) Olefin Macromonomer

The olefin macromonomer is a polymer derived from an olefin composed only of carbon atoms and hydrogen atoms, and is, for example, a polymer having a vinyl group at a chain end-group and exhibiting polymerization reactivity in the presence of the olefin polymerization catalyst shown in the step B below.

Examples of such a macromonomer include a macromonomer consisting of an ethylene homopolymer (WO 2015/147186), a macromonomer consisting of a propylene homopolymer (WO2015/147187), and a macromonomer consisting of a propylene-ethylene copolymer (WO 2017/082182), which have been disclosed by the applicant. Other examples include a macromonomer consisting of a propylene homopolymer (JP-A 2009-299046) and a macromonomer consisting of a propylene-ethylene copolymer (WO 2012/134719). However, the olefin macromonomer is not limited to these examples.

One of the olefin macromonomers can be used alone, or two or more of them can be used in combination.

Hereinafter, the olefin macromonomers will be described in detail.

(i) Composition

The olefin macromonomer is a polymer derived from an olefin composed only of carbon atoms and hydrogen atoms, and is, for example, a polymer containing structural units derived from olefins having 2 to 50 carbon atoms, preferably having 2 to 12 carbon atoms. The olefin macromonomer is preferably a homopolymer or copolymer of one or more olefins selected from ethylene and α-olefins having 3 to 12 carbon atoms.

The olefin having 2 carbon atoms is ethylene. Specific examples of the α-olefins having 3 to 12 carbon atoms include propylene, 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methyl ethyl-1-butene, 1-octene, methyl-1-pentene, ethyl-1-hexene, dimethyl-1-hexene, propyl-1-heptene, methyl ethyl-1-heptene, trimethyl-1-pentene, propyl-1-pentene, diethyl-1-butene, 1-nonene, 1-decene, 1-undecene, 1-dodecene, 1-hexadecene, and 1-octadecene.

Among these olefins, ethylene, propylene, 1-butene, 1-pentene, 1-hexene, 1-octene, 1-decene, 1-hexadecene, 1-octadecene, 4-methyl-1-pentene, 3-methyl-1-pentene, and 3-methyl-1-butene are more preferable, and ethylene and propylene are furthermore preferable.

The olefin macromonomer may be a homopolymer of one of the aforementioned olefins or may be a copolymer of at least two or more selected from the aforementioned olefins.

Preferable examples include an ethylene homopolymer, a propylene homopolymer, and copolymers of ethylene with the α-olefins having 3 to 12 carbon atoms. In such copolymers, the content of repeating units derived from ethylene is preferably in the range of 30 to 70 mol %. Among such copolymers, an ethylene-propylene copolymer is particularly preferable. As for more preferable embodiments of the ethylene-propylene copolymer, the content of structural units derived from ethylene is preferably 20 to 80 mol %, more preferably 30 to 70 mol %, and the content of structural units derived from propylene is preferably 80 to 20 mol %, more preferably 70 to 30 mol %.

The contents of the structural units derived from ethylene and propylene falling within such ranges allow the olefin macromonomer to have flexible polymer chains, thereby to allow an olefin resin comprising a bottle brush polymer obtained by polymerizing the macromonomer to have excellent flexibility.

(ii) Molecular Weight

The olefin macromonomer has a weight-average molecular weight, as determined by gel permeation chromatography (GPC), of preferably in a range of 1,000 to 100,000, more preferably 1,000 to 30,000 or 2,000 to 50,000, further preferably 2,500 to 40,000, particularly preferably 3,000 to 30,000, in terms of polystyrene. The weight-average molecular weight falling within such a range allows an olefin resin comprising a bottle brush polymer obtained by polymerizing the macromonomer to exert excellent properties derived from the bottle brush polymer.

(iii) Vinyl End-Group

The olefin macromonomer is generally obtained by polymerizing an olefin in the presence of an olefin polymerization catalyst, as described for the step A below, and generally comprises a polymer having a carbon-carbon unsaturated bond at a chain end-group due to chain transfer to olefin monomers or stop reactions such as β-hydrogen elimination and β-alkyl elimination. The olefin macromonomer preferably comprises a polymer having a vinyl group at a chain end-group exhibiting polymerization reactivity in the presence of, for example, an olefin polymerization catalyst shown for the step B below. Therefore, the olefin macromonomer has a proportion of vinyl groups of generally 50 mol % or more, more preferably 60 mol % or more, further preferably 70 mol % or more, to all unsaturated end-groups.

Further, the number of the vinyl end-groups contained in the olefin macromonomer is preferably in a range of 0.1 to 10.0, further preferably 0.5 to 8.0, more preferably 1.0 to 6.0, per 1,000 carbon atoms.

The proportion of vinyl groups to all unsaturated end-groups and the number of the vinyl end-groups per 1,000 carbon atoms falling within such ranges are preferable because the proportion of the copolymer of the olefin macromonomer with the non-conjugated diene comonomer contained in the resulting olefin resin of the present invention is high.

The selectivity for the vinyl end-group and the number of the vinyl end-groups per 1,000 carbon atoms can be calculated by conventional methods by polymer structural analysis using $^1$H-NMR measurement.

(2) Non-Conjugated Diene

As the non-conjugated diene, chain or cyclic dienes can be used. Such a diene can be used alone, or two or more of the dienes can be used.

In particular, specific examples thereof include chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, and 4-ethylidene-1,7-undecadiene; and cyclic non-conjugated dienes such as methyl tetrahydro indene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene, and norbornadiene. Among them, 7-methyl-1,6-octadiene is preferable.

Use of a non-conjugated diene with a vinyl group only at one chain end-group (which may be hereinafter referred to as non-conjugated diene with one vinyl end-group) as a chain diene, as described above, is particularly preferable as compared with the case of using a common non-conjugated divinyl compound (α,ω-diene) as a non-conjugated diene, because a sulfur compound can be used as the later-described crosslinking agent. Use of a sulfur compound as the crosslinking agent can suppress a reduction in molecular weight due to decomposition as compared with the case of using a peroxide as the crosslinking agent.

Further, the non-conjugated diene may have a polymer structure. Polyolefin copolymers having vinyl groups at both chain ends described, for example, in WO 2008/026628 may be used as the non-conjugated diene. Specifically, as the non-conjugated diene, a polyolefin polymer containing vinyl groups at both chain ends can be used which contains constituent units derived from at least one selected from the group consisting of ethylene (a), α-olefins having 3 to 20 carbon atoms (b), and cyclic olefins (c) represented by formulas [I], [II], and [III] below, wherein
1) vinyl termination ratio to both chain ends of all molecular chains is 70% or more, and
2) the intrinsic viscosity [η] measured in a decalin solution at 135° C. is in a range of 0.01 to 10 dl/g.

Use of such a non-conjugated diene is preferable because it allows a crosslinked product to be formed in the step B, as described later.

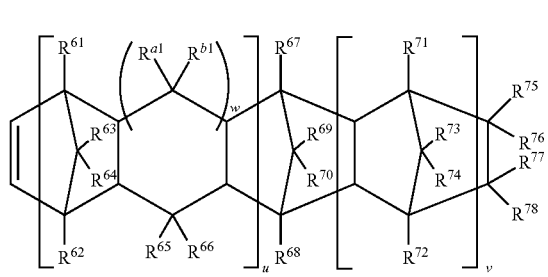

[I]

wherein u is 0 or 1, v is 0 or an integer of 1 or more, w is 0 or 1, $R^{61}$ to $R^{78}$, $R^{a1}$, and $R^{b1}$ may be the same or different from each other and are each a hydrogen atom, a halogen atom, or a hydrocarbon group, $R^{75}$ to $R^{78}$ may be bonded to each other to form a monocyclic or polycyclic ring, the monocyclic or polycyclic ring may have a double bond, and $R^{75}$ and $R^{76}$, or $R^{77}$ and $R^{78}$ may form an alkylidene group.

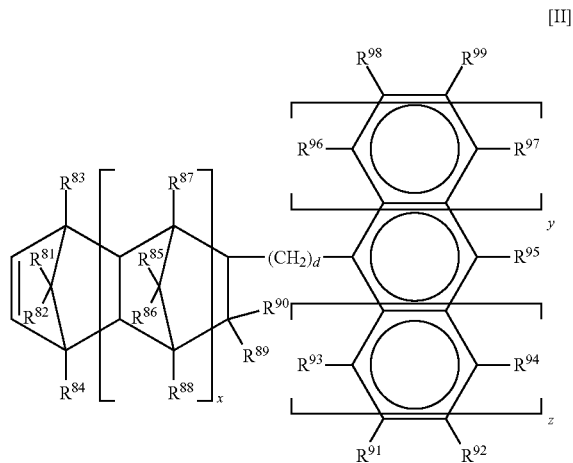

[II]

wherein x and d are each 0 or an integer of 1 or more, y and z are each 0, 1, or 2, $R^{81}$ to $R^{99}$ may be the same or different from each other and are each a hydrogen atom, a halogen atom, an aliphatic hydrocarbon group, an aromatic hydrocarbon group, or an alkoxy group, the carbon atom to which $R^{89}$ and $R^{90}$ are bonded and the carbon atom to which $R^{93}$ is bonded or the carbon atom to which $R^{91}$ is bonded may be bonded directly or via an alkylene group having 1 to 3 carbon atoms, and $R^{95}$ and $R^{92}$, or $R^{95}$ and $R^{99}$ may be bonded to each other to form a monocyclic or polycyclic aromatic ring when y=z=0 is satisfied.

[III]

wherein $R^{100}$ and $R^{101}$ may be the same or different from each other and are each a hydrogen atom or a hydrocarbon group having 1 to 5 carbon atoms, and f is an integer of 1≤f≤18.

(3) Copolymer of Olefin Macromonomer with Non-Conjugated Diene

The content of the copolymer of the olefin macromonomer with the non-conjugated diene in the olefin resin of the present invention is not particularly limited, as long as the copolymer of the olefin macromonomer with the non-conjugated diene is contained, but the content of the copolymer of the olefin macromonomer with the non-conjugated diene is preferably 1 mass % or more, further preferably 5 mass % or more, with respect to the entire olefin resin of the present invention. Further, the content of the copolymer of the olefin macromonomer with the non-conjugated diene is generally 50 mass % or less. The olefin resin of the present invention contains olefin macromonomers in addition to the copolymer of the olefin macromonomer with the non-conjugated diene. The olefin macromonomers are residual macromonomers that have not been used for copolymerization with the non-conjugated diene.

The content of the copolymer of the olefin macromonomer with the non-conjugated diene can be calculated, for example, from an area ratio obtained by comparing the chromatogram by gel permeation chromatography (GPC) of a resin obtained in the step B, which will be described below, with the GPC chromatogram in the step A to separate the peak of newly produced high-molecular weight components.

The polymerization degree of the copolymer of the olefin macromonomer with the non-conjugated diene is preferably 5 or more. The polymerization degree is more preferably 10 or more, further preferably 15 or more.

In the structural units contained in the copolymer of the olefin macromonomer with the non-conjugated diene, the content of structural units derived from the olefin macromonomer is generally 80 to 99.5 mol %, further preferably 90 to 99.5 mol %, furthermore preferably 95 to 99 mol %.

The content of the structural units derived from the non-conjugated diene is generally 0.5 to 20 mol %, further preferably 0.5 to 10 mol %, furthermore preferably 1 to 5 mol %.

The contents of the structural units derived from the olefin macromonomer and the structural units derived from the non-conjugated diene falling within such ranges allow the olefin resin of the present invention to produce a crosslinked product exhibiting good mechanical properties.

The copolymer of the olefin macromonomer with the non-conjugated diene may contain other monomers, that is, comonomers, as long as the effects of the present invention are not impaired, and the content of structural units derived from the comonomer is generally 15 mol % or less, preferably 10 mol % or less, furthermore preferably 5 mol % or less, but it is particularly preferable that the polymer be free from comonomers other than the olefin macromonomer and the non-conjugated diene. Examples of the comonomer include the α-olefins having 2 to 12 carbon atoms described in "(i) Composition" above.

Further, the olefin resin of the present invention may further have the following features.

(I) Molecular Weight

The weight-average molecular weight of the olefin resin of the present invention, as determined by gel permeation chromatography (GPC), is preferably in a range of 5,000 to 1,000,000, in terms of polystyrene. The weight-average molecular weight is preferably in a range of 8,000 to 900,000, more preferably 10,000 to 800,000, further preferably 10,000 to 600,000.

(II) Intrinsic Viscosity

The intrinsic viscosity [η] of the olefin resin of the present invention measured in decalin at 135° C. is preferably in a range of 0.1 to 10 dl/g, more preferably 0.2 to 8 dl/g, further preferably 0.3 to 5 dl/g.

(III) Composition

The content of repeating units derived from ethylene in the olefin resin is preferably in a range of 10 to 90 mol %. The content of the repeating units is preferably in a range of 20 to 80 mol %, more preferably 30 to 70 mol %.

<Method for Producing Olefin Resin>

The olefin resin of the present invention can be produced, for example, by a production method including step A and step B below:

Step A: a step of producing an olefin macromonomer by polymerizing an olefin in the presence of an olefin polymerization catalyst; and Step B: a step of producing an olefin resin by copolymerizing the olefin macromonomer produced in the step A with a non-conjugated diene in the presence of an olefin polymerization catalyst.

Hereinafter, the step A and the step B will be sequentially described. The olefin polymerization catalyst used in the step A and the olefin polymerization catalyst used in the step B may be the same or different, but different catalysts are generally used depending on the purposes of the steps.

[Step A]

The step A is a step of producing the olefin macromonomer by polymerizing an olefin in the presence of an olefin polymerization catalyst, and the olefin polymerization catalyst preferably comprises components (A) and (C) below:

(A) a transition metal compound of group 4 in the periodic table, and (C) at least one compound selected from the group consisting of (C-1) an organic metal compound, (C-2) an organoaluminum oxy compound, and (C-3) a compound that reacts with the transition metal compound (A) of group 4 in the periodic table to form an ion pair.

Such a step may be a process for producing a macromonomer consisting of an ethylene homopolymer (WO 2015/147186), a process for producing a macromonomer consisting of a propylene homopolymer (WO 2015/147187), and a process for producing a macromonomer consisting of a propylene-ethylene copolymer (WO 2017/082182), which have been disclosed by the applicant. Alternatively, such a step may be a process for producing a macromonomer consisting of a propylene homopolymer (JP-A 2009-299046) and a process for producing a macromonomer consisting of a propylene-ethylene copolymer (WO 2012/134719). However, the step is not limited to these processes.

Hereinafter, a preferable embodiment of the step A will be described by way of an example of an ethylene-propylene copolymer that is particularly preferable as the olefin macromonomer.

(Transition Metal Compound (A))

The transition metal compound (A) of group 4 in the periodic table is preferably a transition metal compound of group 4 in the periodic table containing a ligand having a dimethylsilylbisindenyl skeleton.

As the transition metal compound (A) of group 4 in the periodic table containing a ligand having a dimethylsilylbisindenyl skeleton, a compound disclosed in Resconi, L. JACS 1992, 114, 1025-1032 or the like is known, and an olefin polymerization catalyst for producing terminally unsaturated polypropylene can be suitably used.

Other than above, compounds disclosed in, for example, patent literatures JP-A H6-100579, JP-A 2001-525461, JP-A 2005-336091, JP-A 2009-299046, JP-A H11-130807, or JP-A 2008-285443 can be suitably used as the transition metal compound (A) of group 4 in the periodic table containing a ligand having a dimethylsilylbisindenyl skeleton.

More specifically, suitable examples of the transition metal compound (A) of group 4 in the periodic table containing a ligand having a dimethylsilylbisindenyl skeleton include a compound selected from the group consisting of crosslinked bis(indenyl)zirconocenes or hafnocenes. Dimethylsilyl-crosslinked bis(indenyl)zirconocenes or hafnocenes are more preferable. Dimethylsilyl-crosslinked bis(indenyl)hafnocenes are further preferable, and by selecting a hafnocene, the probability that an ethylene-propylene copolymer to be obtained has a vinyl group at a chain end-group increases, resulting in a macromonomer exhibiting good reactivity in the step B.

More specifically, dimethylsilylbis(2-methyl-4-phenylindenyl)hafnium dichloride or dimethylsilylbis(2-methyl-4-phenylindenyl)hafnium dimethyl can be used as a suitable compound.

(Compound (C))

The compound (C) used in the step A reacts with the transition metal compound (A) of group 4 in the periodic table to function as an olefin polymerization catalyst and is specifically selected from the group consisting of (C-1) the organic metal compound, (C-2) the organoaluminum oxy compound, and (C-3) the compound that reacts with the transition metal compound (A) to form an ion pair. As the compounds (C-1) to (C-3), the compounds (C-1) to (C-3) disclosed in WO 2015/147186 can be used as they are without limitation. In Examples, which will be described below, triisobutyl aluminum and triphenylcarbenium tetrakis(pentafluorophenyl) borate are used, but the compound (C) is not limited to these compounds at all.

The step A can be performed by any method of vapor phase polymerization, slurry polymerization, bulk polymerization, and solution (dissolution) polymerization, and the polymerization form is not particularly limited.

In the case where the step A is performed by solution polymerization, examples of the polymerization solvent include aliphatic hydrocarbons and aromatic hydrocarbons. Specifically, examples thereof include aliphatic hydrocarbons such as propane, butane, pentane, hexane, heptane, octane, decane, dodecane, and kerosene, alicyclic hydrocarbons such as cyclopentane, cyclohexane, and methyl cyclopentane, aromatic hydrocarbons such as benzene, toluene, and xylene, and halogenated hydrocarbons such as ethylene chloride, chlorobenzene, and dichloromethane. One of these can be used alone, or two or more of them can be used in combination.

Further, the polymerization temperature in the step A is generally in a range of 50° C. to 200° C., preferably 80° C. to 150° C., more preferably 80° C. to 130° C. Appropriately controlling the polymerization temperature enables an ethylene-propylene copolymer with a desired molecular weight and a desired content of vinyl end-groups to be obtained.

The polymerization pressure in the step A is generally normal pressure to 10 MPa gauge pressure, preferably normal pressure to 5 MPa gauge pressure. The polymerization reaction can be performed by any of batch, semi-continuous, and continuous methods. Among these, it is preferable to employ a method involving copolymerization by continuously supplying the monomer to a reactor in the present invention.

The reaction time (the average residence time in the case where copolymerization is performed by a continuous method) differs depending on the conditions such as the catalyst concentration and the polymerization temperature but is generally 0.5 minutes to 5 hours, preferably 5 minutes to 3 hours.

The polymer concentration in the step A is 5 to 50 wt % at the completion of polymerization in the case of the batch method or during steady operation in the case of the continuous method.

The content of structural units derived from ethylene of the ethylene-propylene copolymer macromonomer produced in the step A is preferably 20 to 80 mol %, more preferably 30 to 70 mol %, and the content of structural units derived from propylene thereof is preferably 80 to 20 mol %, more preferably 70 to 30 mol %.

Further, the weight-average molecular weight (Mw) of the ethylene-propylene copolymer macromonomer produced in the step A, as determined by gel permeation chromatography (GPC), is preferably in a range of 1,000 to 100,000, more preferably 1,000 to 30,000 or 2,000 to 50,000, further preferably 2,500 to 40,000, particularly preferably 3,000 to 30,000, in terms of polystyrene. Within such a range, the olefin resin of the present invention exerts excellent properties derived from the bottle brush polymer.

The molecular weight distribution (Mw/Mn) of the ethylene-propylene copolymer macromonomer produced in the step A is, for example, 1.5 to 5.0, typically about 1.7 to 4.0. A mixture of side chains having different molecular weights may be used depending on the circumstances.

The proportion of vinyl groups to all unsaturated end-groups of the ethylene-propylene copolymer macromonomer produced in the step A is generally 50 mol % or more, more preferably 60 mol % or more, further preferably 70 mol % or more.

Further, the number of the vinyl end-groups contained in the ethylene-propylene copolymer macromonomer produced in the step A is preferably in a range of 0.1 to 10.0, further preferably 0.5 to 8.0, more preferably 1.0 to 6.0, per 1,000 carbon atoms.

The proportion of vinyl groups to all unsaturated end-groups and the number of the vinyl end-groups per 1,000 carbon atoms falling within such ranges are preferable because the proportion of the copolymer of the olefin macromonomer with the non-conjugated diene comonomer contained in the resulting olefin resin of the present invention is high.

The selectivity for the vinyl end-group and the number of the vinyl end-groups per 1,000 carbon atoms can be calculated by conventional methods by polymer structural analysis using $^1$H-NMR measurement.

[Step B]

The step B is a step of producing the olefin resin of the present invention by copolymerizing the olefin macromonomer produced in the step A with a non-conjugated diene in the presence of an olefin polymerization catalyst, and the olefin polymerization catalyst preferably comprises components (B) and (C) below:

(B) a transition metal compound of group 4 in the periodic table, and (C) at least one compound selected from the group consisting of (C-1) an organic metal compound, (C-2) an organoaluminum oxy compound, and (C-3) a compound that reacts with the transition metal compound (B) of group 4 in the periodic table to form an ion pair.

(Transition Metal Compound (B))

Since the olefin macromonomer is copolymerized with the non-conjugated diene in the step B, it is preferable to select a polymerization catalyst having a high polymerization performance for a bulky monomer species and a performance of giving a high-molecular weight substance. Examples of the transition metal compound used for such a polymerization catalyst include crosslinked metallocene compounds disclosed in WO 2001/27124 and WO 2004/029062, and a tetradentate phenolate ether compound disclosed in WO 2003/091262. Specifically, the transition metal compound is preferably the transition metal compound (B) comprising a compound (I) represented by formula [I] below:

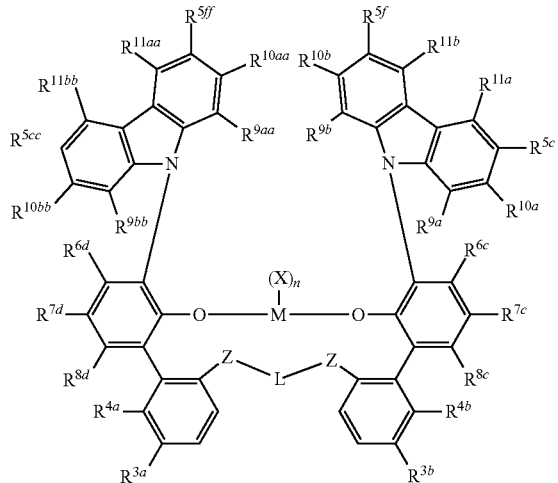

wherein M is a metal atom selected from groups 3 to 6 in the periodic table of the elements, n is an integer of 0 to 5, wherein X does not exist when n is 0, X is independently a neutral, monoanionic, dianionic, trianionic, or tetraanionic monodentate ligand or a neutral, monoanionic, or dianionic bidentate ligand formed by two Xs, wherein X and n are selected so that the compound (I) is totally neutral, Z is independently O, S, N ($C_1$-$C_{40}$) hydrocarbyl, or P ($C_1$-$C_{40}$) hydrocarbyl, L is ($C_1$-$C_{40}$) hydrocarbylene or ($C_1$-$C_{40}$) heterohydrocarbylene, wherein the ($C_1$-$C_{40}$) hydrocarbylene has a portion that comprises a 1-carbon atom to 18-carbon atom linker backbone linking the Z, the ($C_1$-$C_{40}$) heterohydrocarbylene has a portion that comprises a 1-atom to 18-atom linker backbone linking the Z, the 1 to 18 atoms in the 1-atom to 18-atom linker backbone of the ($C_1$-$C_{40}$) heterohydrocarbylene are each independently a carbon atom or a heteroatom, the heteroatom is independently O, S, S(O), S(O)$_2$, Si($^R$C)$_2$, P($^R$P), or N($^R$N), the RC is independently substituted or unsubstituted ($C_1$-$C_{18}$) hydrocarbyl or ($C_1$-$C_{18}$) heterohydrocarbyl, the RP is independently substituted or unsubstituted ($C_1$-$C_{18}$) hydrocarbyl or ($C_1$-$C_{18}$) heterohydrocarbyl, and the RN is independently substituted or unsubstituted ($C_1$-$C_{18}$) hydrocarbyl or ($C_1$-$C_{18}$) heterohydrocarbyl or does not exist, $R^{3a}$, $R^{4a}$, $R^{3b}$, and $R^{4b}$ are each independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, at least one of $R^{6c}$, $R^{7c}$, and $R^{8c}$, and at least one of $R^{6d}$, $R^{7d}$, and $R^{8d}$ are each independently ($C_2$-$C_{40}$) hydrocarbyl or Si($^R$C) and the others of $R^{6c}$, $R^{7c}$, $R^{8c}$, $R^{6d}$, $R^{7d}$, and $R^{8d}$ are each independently a hydrogen atom, ($C_1$-$C_{40}$) hydrocarbyl, ($C_1$-$C_{40}$) heterohydrocarbyl, Si($^R$C) O($^R$C), S($^R$C), N($^R$N)$_2$, P($^R$P)$_2$, or a halogen atom, two or more R groups that are arbitrarily selected from $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ may be bonded together to form one or more ring structures, wherein such a ring structure has 3 to 50 atoms in the ring not counting hydrogen atoms, at least one of $R^{5c}$ and $R^{5f}$ is independently ($C_1$-$C_{40}$) hydrocarbyl, ($C_1$-$C_{40}$) heterohydrocarbyl, Si($^R$C) O($^R$C), S($^R$C), ($^R$N)$_2$, P($^R$P)$_2$, or a halogen atom, and the other of $R^{5c}$ and $R^{5f}$ is independently a hydrogen atom, ($C_1$-$C_{40}$) hydrocarbyl, ($C_1$-$C_{40}$) heterohydrocarbyl, Si($^R$C) O($^R$C), S($^R$C), N($^R$N)$_2$, P($^R$P)$_2$, or a halogen atom, at least one of $R^{5cc}$ and $R^{5ff}$ is independently ($C_1$-$C_{40}$) hydrocarbyl, ($C_1$-$C_{40}$) heterohydrocarbyl, Si($^R$C) O($^R$C), S($^R$C), N($^R$N)$_2$, P($^R$P)$_2$, or a halogen atom, and the other of $R^{5cc}$ and $R^{5ff}$ is independently a hydrogen atom, ($C_1$-$C_{40}$) hydrocarbyl, (($C_1$-$C_{40}$) heterohydrocarbyl, Si($^R$C)$_3$, O($^R$C), S($^R$C), N($^R$N)$_2$, P($^R$P)$_2$, or a halogen atom, $R^{9a}$, $R^{10a}$, $R^{11a}$, $R^{9b}$, $R^{10b}$, $R^{11b}$, $R^{9aa}$, $R^{10aa}$, $R^{11aa}$, $R^{9bb}$, $R^{10bb}$ and $R^{11bb}$ are each independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, two or more R groups that are arbitrarily selected from substituents on the carbazole group may be bonded together to form one or more ring structures, wherein such a ring structure has 3 to 50 atoms in the ring not counting hydrogen atoms, the hydrocarbyl, heterohydrocarbyl, hydrocarbylene, and heterohydrocarbylene groups are each independently unsubstituted or substituted with at least one substituent $R^s$ (up to and including persubstitution by $R^s$), the sum of carbon atoms of $R^{5c}$+$R^{5f}$+$R^{7c}$ or the sum of carbon atoms of $R^{5cc}$+$R^{5ff}$+$R^{7d}$ is over 5 carbon atoms, and $R^s$ is independently a halogen atom, polyfluoro-substitution, perfluoro-substitution, unsubstituted ($C_1$-$C_{18}$) alkyl, $F_3C$—, $FCH_2O$—, $F_2HCO$—, $F_3CO$—, $R_3Si$—, RO—, RS—, RS(O)—, RS(O)$_2$—, $R_2P$—, $R_2N$—, $R_2C$=N—, NC—, RC(O)O—, ROC(O)—, RC(O)N(R)—, or $R_2NC$ (O)—, or the two $R^s$s are bonded together to form unsubstituted ($C_1$-$C_{18}$) alkylene, wherein the R is independently unsubstituted ($C_1$-$C_{18}$) alkyl.

[Compound (I)]

The compound (I) is represented by formula [I] below.

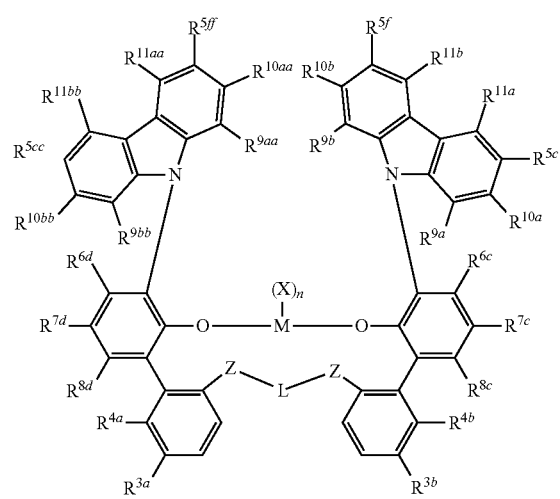

In formula [I], the symbols are defined as follows:

M is any one metal atom of groups 3 to 6 (for example, group 4) in the periodic table of the elements, wherein the metal M is in a formal oxidation state of +2, +3, +4, +5, or +6, n is an integer of 0 to 5, wherein X does not exist when n is 0 (that is, (X)$_n$ does not exist), X is independently a neutral, monoanionic, dianionic, trianionic, or tetraanionic monodentate ligand or a neutral, monoanionic, or dianionic bidentate ligand formed by two Xs, wherein X and n are selected so that the compound (I) is totally neutral, Z is independently O, S, N ($C_1$-$C_{40}$) hydrocarbyl, or P ($C_1$-$C_{40}$) hydrocarbyl, L is ($C_1$-$C_{40}$) hydrocarbylene or ($C_1$-$C_{40}$) heterohydrocarbylene, wherein the ($C_1$-$C_{40}$) hydrocarbylene has a portion that comprises a 1-carbon atom to 18-carbon atom linker backbone, preferably, a 1-carbon atom to 12-carbon atom linker, linking the Z (to which the L is bonded), the ($C_1$-$C_{40}$) heterohydrocarbylene has a portion that comprises a 1-atom to 18-atom linker backbone, preferably, 1-carbon atom to 12-carbon atom linker chain, linking the Z, the 1 to 18 atoms in the 1-atom to 18-atom linker backbone of the ($C_1$-$C_{40}$) heterohydrocarbylene are each independently a carbon atom or a heteroatom, the heteroatom is independently O, S, S(O), S(O)$^2$, Si($^R$C)$_2$, P($^R$P), or N($^R$N), the $^R$C is independently substituted or unsubstituted ($C_1$-$C_{18}$) hydrocarbyl or ($C_1$-$C_{18}$) heterohydrocarbyl, the $^R$P is independently substituted or unsubstituted ($C_1$-$C_{18}$) hydrocarbyl or ($C_1$-$C_{18}$) heterohydrocarbyl, and the $^R$N is independently substituted or unsubstituted ($C_1$-$C_{18}$) hydrocarbyl or ($C_1$-$C_{18}$) heterohydrocarbyl or does not exist (for example, N($^R$N) may be bonded as —N=), $R^{3a}$, $R^{4a}$, $R^{3b}$, and $R^{4b}$ are each independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, wherein $^R$C, $^R$N, and $^R$P are as defined above, at least one of $R^{6c}$, $R^{7c}$, and $R^{8c}$ and at least one of $R^{6d}$, $R^{7d}$, and $R^{8d}$ are each independently ($C_2$-$C_{40}$) hydrocarbyl or Si($^R$C)$_3$, and the others of $R^{6c}$, $R^{7c}$, $R^{8c}$, $R^{6d}$, $R^{7d}$, and $R^{8d}$ are each independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, wherein $^R$C, $^R$N, and $^R$P are as defined above, two or more R groups that are arbitrarily selected from $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ may be bonded together to form one or more ring structures, wherein such a ring structure has 3 to 50 atoms in the ring not counting hydrogen atoms, at least one of $R^{5c}$ and $R^{5f}$ is independently ($C_1$-$C_{40}$) hydrocarbyl, ($C_1$-$C_{40}$) heterohydrocarbyl, Si($^R$C)$_3$, O($^R$C), S($^R$C), ($^R$N)$_2$, P($^R$P)$_2$, or a halogen atom, and the other of $R^{5c}$ and $R^{5f}$ is independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, wherein $^R$C, $^R$N, and $^R$P are as defined above, at least one of $R^{5cc}$ and $R^{5ff}$ is independently ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, and the other of $R^{5cc}$ and $R^{5ff}$ is independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N)$_2$, P($^R$P)$_2$, or a halogen atom, wherein $^R$C, $^R$N, and $^R$P are as defined above, $R^{9a}$, $R^{10a}$, $R^{11a}$, $R^{9b}$, $R^{10b}$, $R^{11b}$, $R^{9aa}$, $R^{10aa}$, $R^{11aa}$, $R^{9bb}$, $R^{10bb}$, and $R^{11bb}$ are each independently a hydrogen atom, ($C_1$-$C_{40}$) hydrocarbyl, ($C_1$-$C_{40}$) heterohydrocarbyl, Si($^R$C)$_3$, O($^R$C), S($^R$C), N($^R$N) 2, P($^R$P)$_2$, or a halogen atom, wherein $^R$C, $^R$N, and $^R$P are as defined above, two or more R groups that are arbitrarily selected from substituents on the carbazole group (for example, $R^{9a}$, $R^{10a}$, $R^{5a}$, $R^{11a}$, $R^{9b}$, $R^{10b}$, $R^{5f}$, and $R^{11b}$) may be bonded together to form one or more ring structures, wherein such a ring structure has 3 to 50 atoms in the ring not counting hydrogen atoms, the hydrocarbyl (for example, $^R$C, $^R$N, $^R$P, and ($C_1$-$C_{40}$) hydrocarbyl), heterohydrocarbyl (for example, ($C_1$-$C_{40}$) heterohydrocarbyl), hydrocarbylene (for example, ($C_1$-$C_{40}$) hydrocarbylene), and heterohydrocarbylene (for example, ($C_1$-$C_{40}$) heterohydrocarbylene) groups are each independently unsubstituted or substituted with at least one substituent $R^s$ (up to and including persubstitution by $R^s$), the sum of carbon atoms of $R^{5c}$+$R^{5f}$+$R^{7c}$ or the sum of carbon atoms of $R^{5cc}$+$R^{5ff}$+$R^{7d}$ is over 5 carbon atoms, and $R^s$ is independently a halogen atom, polyfluoro-substitution (that is one of the at least one substituent RS stands for at least two fluoro substituents, which formally replace at least two hydrogen atoms of an unsubstituted version of the substituted group), perfluoro-substitution (that is the one $R^s$ stands for as many fluoro substituents as hydrogen atoms of an unsubstituted version of the substituted group that is substituted thereby), unsubstituted ($C_1$-$C_{18}$) alkyl, $F_3C$—, $FCH_2O$—, $F_2HCO$—, $F_3CO$—, $R_3Si$—, RO—, RS—, RS(O)—, RS(O)$_2$—, $R_2P$—, $R_2N$—, $R_2C$=N—, NC—, RC(O)O—, ROC(O)—, RC(O)N(R)—, or $R_2NC(O)$—, or the two $R^s$s are bonded together to form unsubstituted ($C_1$-$C_{18}$) alkylene, wherein the R is independently unsubstituted ($C_1$-$C_{18}$) alkyl.

It is preferable that each Z in formula [I] above be O, and it is more preferable that the compound (I) be a compound (Ia) represented by formula [Ia] below.

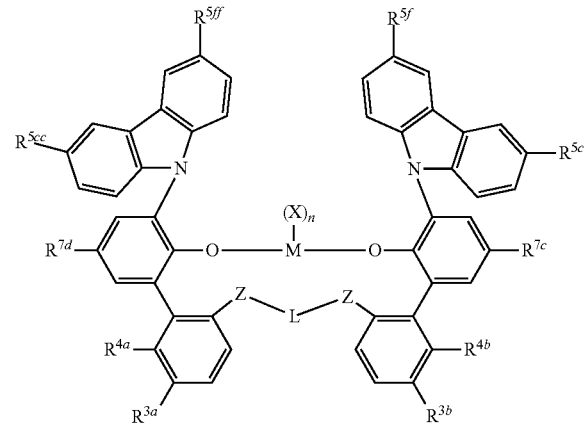

In formula [Ia], the symbols are defined as follows:

Z is O, $R^{7c}$ and $R^{7d}$ are each independently ($C_1$-$C_{40}$) hydrocarbyl, M is any one metal atom of groups 3 to 6 (for example, group 4) in the periodic table of the elements, wherein the metal M is in a formal oxidation state of +2, +3, +4, +5, or +6, n is an integer of 0 to 5, wherein X does not exist when n is 0 (that is, (X)n does not exist), X is independently a neutral, monoanionic, dianionic, trianionic, or tetraanionic monodentate ligand or a neutral, monoanionic, or dianionic bidentate ligand formed by two Xs, wherein X and n are selected so that the compound (Ia) is totally neutral, L is ($C_1$-$C_{40}$) hydrocarbylene or ($C_1$-$C_{40}$) heterohydrocarbylene, wherein the ($C_1$-$C_{40}$) hydrocarbylene has a portion that comprises a 1-carbon atom to 18-carbon atom linker backbone, preferably, a 1-carbon atom to 12-carbon atom linker, linking the Z (to which the L is bonded), the ($C_1$-$C_{40}$) heterohydrocarbylene has a portion that comprises a 1-atom to 18-atom linker backbone, preferably, 1-carbon atom to 12-carbon atom linker chain, linking the Z, the 1 to 18 atoms in the 1-atom to 18-atom linker backbone of the $(C_1-C_{40})$ heterohydrocarbylene are each independently a carbon atom or a heteroatom, each heteroatom is independently O, S, S(O), S(O)$_2$, Si($^RC$)$_2$, P($^RP$), or N($^RN$), the $^RC$ is independently substituted or unsubstituted $(C_1-C_{18})$ hydrocarbyl or $(C_1-C_{18})$ heterohydrocarbyl, the RP is independently substituted or unsubstituted $(C_1-C_{18})$ hydrocarbyl or $(C_1-C_{18})$ heterohydrocarbyl, and the RN is independently substituted or unsubstituted $(C_1-C_{18})$ hydrocarbyl or $(C_1-C_{18})$ heterohydrocarbyl or does not exist (for example, N($^RN$) may be bonded as —N=), $R^{3a}$, $R^{4a}$, $R^{3b}$, and $R^{4b}$ are each independently a hydrogen atom, $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, wherein $^RC$, $^RN$, and $^RP$ are as defined above, at least one of $R^{5c}$ and $R^{5f}$ is independently $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, and the other of $R^{5c}$ and $R^{5f}$ is independently a hydrogen atom, $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, wherein $^RC$, $^RN$, and $^RP$ are as defined above, at least one of $R^{5cc}$ and $R^{5ff}$ is independently $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, and the other of $R^{5cc}$ and $R^{5ff}$ is independently a hydrogen atom, $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, wherein $^RC$, $^RN$, and $^RP$ are as defined above, the hydrocarbyl (for example, $^RC$, $^RN$, $^RP$, or $(C_1-C_{40})$ hydrocarbyl), heterohydrocarbyl (for example, $(C_1-C_{40})$ heterohydrocarbyl), hydrocarbylene (for example, $(C_1-C_{40})$ hydrocarbylene), and heterohydrocarbylene (for example, $(C_1-C_{40})$ heterohydrocarbylene) groups are each independently unsubstituted or substituted with at least one substituent $R^s$ (up to and including persubstitution by $R^s$), the sum of carbon atoms of $R^{5c}+R^{5f}+R^{7c}$ or the sum of carbon atoms of $R^{5cc}+R^{5ff}+R^{7d}$ is over 5 carbon atoms, and $R^s$ is independently a halogen atom, polyfluoro-substitution (that is one of the at least one substituent RS stands for at least two fluoro substituents, which formally replace at least two hydrogen atoms of an unsubstituted version of the substituted group), perfluoro-substitution (that is the one RS stands for as many fluoro substituents as hydrogen atoms of an unsubstituted version of the substituted group that is substituted thereby), unsubstituted $(C_1-C_{18})$ alkyl, $F_3C$—, $FCH_2O$—, $F_2HCO$—, $F_3CO$—, $R_3Si$—, RO—, RS—, RS(O)—, RS(O)$_2$—, $R_2P$—, $R_2N$—, $R_2C$=N—, NC—, RC(O)O—, ROC(O)—, RC(O)N(R)—, or $R_2NC(O)$—, or the two $R^s$s are bonded together to form unsubstituted $(C_1-C_{18})$ alkylene, wherein the R is independently unsubstituted $(C_1-C_{18})$ alkyl.

It is furthermore preferable that the compound (I) be a compound (Ia-1) represented by formula [Ia-1] below.

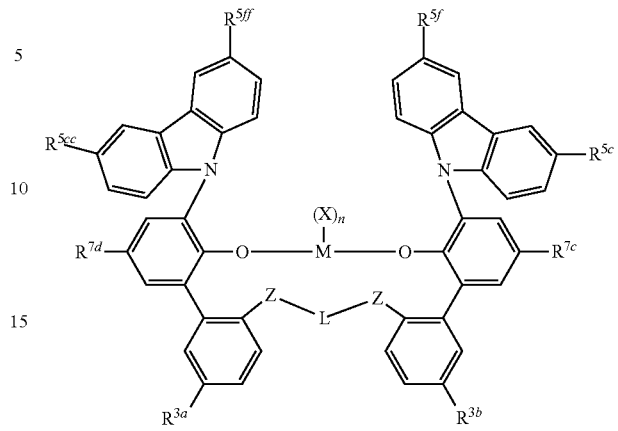

[Ia-1]

In formula [Ia-1], the symbols are defined as follows:
Z is O,
$R^{7c}$ and $R^{7d}$ are each independently $(C_4-C_{40})$ hydrocarbyl,
M is any one metal atom of groups 3 to 6 (for example, group 4) in the periodic table of the elements, wherein the metal M is in a formal oxidation state of +2, +3, +4, +5, or +6, n is an integer of 0 to 5, wherein X does not exist when n is 0 (that is, (X)n does not exist), X is independently a neutral, monoanionic, dianionic, trianionic, or tetraanionic monodentate ligand or a neutral, monoanionic, or dianionic bidentate ligand formed by two Xs, wherein X and n are selected so that the compound (Ia-1) is totally neutral, L is $(C_1-C_{40})$ hydrocarbylene or $(C_1-C_{40})$ heterohydrocarbylene, wherein the $(C_1-C_{40})$ hydrocarbylene has a portion that comprises a 1-carbon atom to 18-carbon atom linker backbone, preferably, a 1-carbon atom to 12-carbon atom linker, linking the Z (to which the L is bonded), the $(C_1-C_{40})$ heterohydrocarbylene has a portion that comprises a 1-atom to 18-atom linker backbone, preferably, 1-carbon atom to 12-carbon atom linker chain, linking the Z, the 1 to 18 atoms in the 1-atom to 18-atom linker backbone of the $(C_1-C_{40})$ heterohydrocarbylene are each independently a carbon atom or a heteroatom, the heteroatom is independently O, S, S(O), S(O)$_2$, Si($^RC$)$_2$, P($^RP$), or N($^RN$), the $^RC$ is independently substituted or unsubstituted $(C_1-C_{18})$ hydrocarbyl or $(C_1-C_{18})$ heterohydrocarbyl, the RP is independently substituted or unsubstituted $(C_1-C_{18})$ hydrocarbyl or $(C_1-C_{18})$ heterohydrocarbyl, and the $^RN$ is independently substituted or unsubstituted $(C_1-C_{18})$ hydrocarbyl or $(C_1-C_{18})$ heterohydrocarbyl or does not exist (for example, N($^RN$) may be bonded as —N=), $R^{3a}$ and $R^{3b}$ are each independently a hydrogen atom, $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, wherein $^RC$, $^RN$, and $^RP$ are as defined above, at least one of $R^{5c}$ and $R^{5f}$ is independently $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, and the other of $R^{5c}$ and $R^{5f}$ is independently a hydrogen atom, $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, wherein $^RC$, $^RN$, and $^RP$ are as defined above, at least one of $R^{5cc}$ and $R^{5ff}$ is independently $(C_1-C_{40})$ hydrocarbyl, $(C_1-C_{40})$ heterohydrocarbyl, Si($^RC$)$_3$, O($^RC$), S($^RC$), N($^RN$)$_2$, P($^RP$)$_2$, or a halogen atom, and the other of $R^{5cc}$ and $R^{5ff}$ is independently a hydrogen atom, $(C_1-C_{40})$ hydrocarbyl, $(C_1-C_{40})$ heterohydrocarbyl, $Si(^RC)_3$, $O(^RC)$, $S(^RC)$, $N(^RN)_2$, $P(^RP)_2$, or a halogen atom, wherein $^RC$, $^RN$, and $^RP$ are as defined above, the hydrocarbyl (for example, $^RC$, $^RN$, $^RP$, or $(C_1-C_{40})$ hydrocarbyl), heterohydrocarbyl (for example, $(C_1-C_{40})$ heterohydrocarbyl), hydrocarbylene (for example, $(C_1-C_{40})$ hydrocarbylene), and heterohydrocarbylene (for example, $(C_1-C_{40})$ heterohydrocarbylene) groups are each independently unsubstituted or substituted with at least one substituent $R^s$ (up to and including persubstitution by $R^s$), the sum of carbon atoms of $R^{5c}+R^{5f}+R^{7c}$ or the sum of carbon atoms of $R^{5cc}+R^{5ff}+R^{7d}$ is over 5 carbon atoms, and the $R^s$ is independently a halogen atom, polyfluoro-substitution (that is one of the at least one substituent RS stands for at least two fluoro substituents, which formally replace at least two hydrogen atoms of an unsubstituted version of the substituted group), perfluoro-substitution (that is the one RS stands for as many fluoro substituents as hydrogen atoms of an unsubstituted version of the substituted group that is substituted thereby), unsubstituted $(C_1-C_{18})$ alkyl, $F_3C$—, $FCH_2O$—, $F_2HCO$—, $F_3CO$—, $R_3Si$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, or $R_2NC(O)$—, or the two $R^s$s are bonded together to form unsubstituted $(C_1-C_{18})$ alkylene, wherein the R is independently unsubstituted $(C_1-C_{18})$ alkyl.

In formula [Ia-1] above, $R^{5c}$, $R^{5f}$, $R^{5cc}$, and $R^{5ff}$ are each independently $(C_1-C_{40})$ hydrocarbyl, preferably $(C_1-C_{10})$ hydrocarbyl, more preferably $(C_1-C_{10})$ hydrocarbyl, particularly preferably $(C_4-C_8)$ alkyl or phenyl, $R^{7c}$ and $R^{7d}$ are each independently $(C_4-C_{10})$ hydrocarbyl, preferably $(C_4-C_8)$ alkyl, $R^{3a}$ and $R^{3b}$ are each independently $(C_1-C_6)$ alkyl, $(C_1-C_6)$ alkyl-O—, $((C_1-C_6)$ alkyl)$_2$-N—, $(C_3-C_6)$ cycloalkyl, a fluorine atom, or a chlorine atom, preferably a fluorine atom or a chlorine atom, more preferably a fluorine atom, L is $(C_1-C_{10})$ hydrocarbylene, preferably $(C_1-C_{10})$ hydrocarbylene, more preferably $(C_1-C_5)$ hydrocarbylene, further preferably —$CH_2CH_2CH_2$—, M is a metal of group 4 in the periodic table of the elements, preferably hafnium, zirconium, or titanium, more preferably hafnium, n is 2 or 3, preferably 2, X is independently $(C_1-C_8)$ alkyl, $(C_1-C_6)$ alkyl, $(C_1-C_4)$ alkyl, or $(C_1-C_3)$ alkyl, preferably $(C_1-C_4)$ alkyl or $(C_1-C_3)$ alkyl, more preferably $(C_1-C_3)$ alkyl, further preferably methyl, according to a particularly preferable embodiment of the compound (I).

Specific examples of the compound (I) include (2',2"-(propane-1,3-diylbis(oxy))bis(3-(3,6-di-tert-butyl-9H-carbazole-9-yl)-5'-fluoro-5-(2,4,4-trimethylpentane-2-yl)biphenyl-2-ol) dimethylhafnium, and [[2',2"-[1,3-propanediylbis(oxy-kO)]bis[3-[3,6-bis(1,1-dimethyl ethyl)-9H-carbazole-9-yl]-5'-fluoro-5-(1,1,3,3-tetramethylbutyl) [1,1'-biphenyl]-2-olato-kO]](2-)]-hafnium dimethyl.

As the compound (I), the embodiment described in patent literature JP-A 2015-500920 can be cited.

(Compound (C))

The compound (C) used in the step B reacts with the transition metal compound (B) of group 4 in the periodic table to function as an olefin polymerization catalyst. Specifically, the compound (C) is selected from the group consisting of (C-1) the organic metal compound, (C-2) the organoaluminum oxy compound, and (C-3) the compound that reacts with the transition metal compound (A) to form an ion pair. Examples of such compounds (C-1) to (C-3) include the compounds as described for the compound (C) used in the step A.

The step B can be performed by solution (dissolution) polymerization, and the polymerization conditions are not specifically limited, as long as a solution polymerization process for producing an olefin polymer is used.

In the step B, the macromonomer produced in the step A in the form of a solid product, a solution, or a slurry may be put into a reactor in the step B, and the method for putting the macromonomer is not especially limited.

In the step B, the compound described above in "(2) Non-conjugated diene" is preferably used as the non-conjugated diene to be copolymerized with the olefin macromonomer. The method for putting the non-conjugated diene into the reactor is not specifically limited, as long as it is a known method used for producing an olefin resin.

In the step B, a comonomer may be copolymerized, as long as the effects of the present invention are not impaired, and examples thereof include the olefins having 2 to 12 carbon atoms described above in "(i) Composition". The method for putting the comonomer into the reactor is not specifically limited, as long as it is a known method used for producing an olefin resin.

Examples of the polymerization solvent in the step B include aliphatic hydrocarbons and aromatic hydrocarbons. Specifically, examples thereof include aliphatic hydrocarbons such as propane, butane, pentane, hexane, heptane, octane, decane, dodecane, and kerosene, alicyclic hydrocarbons such as cyclopentane, cyclohexane, and methyl cyclopentane, aromatic hydrocarbons such as benzene, toluene, and xylenes, and halogenated hydrocarbons such as ethylene chloride, chlorobenzene, and dichloromethane. One of these can be used alone, or two or more of them can be used in combination. Further, the polymerization solvent in the step B may be the same or different from the polymerization solvent in the step A. Among these, aliphatic hydrocarbons such as hexane and heptane are preferable from an industrial point of view, and hexane is preferable in view of separation and purification from olefin resins.

Further, the polymerization temperature in the step B is preferably 30° C. or more, more preferably in a range of 30° C. to 150° C., furthermore preferably in a range of 40° C. to 100° C.

The polymerization pressure in the step B is generally normal pressure to 10 MPa gauge pressure, preferably normal pressure to 5 MPa gauge pressure. The polymerization reaction can be performed by any of batch, semi-continuous, and continuous methods. Further, polymerization can be performed in two stages or more with different reaction conditions. Among these, it is preferable to employ a method involving copolymerization by continuously supplying the monomer to the reactor in the present invention.

The reaction time (the average residence time in the case where copolymerization is performed by a continuous method) in the step B differs depending on the conditions such as the catalyst concentration and the polymerization temperature but is generally 0.5 minutes to 5 hours, preferably 5 minutes to 3 hours.

The polymer concentration in the step B is 5 to 50 wt % at the completion of polymerization in the case of the batch method or during steady operation in the case of the continuous method.

The molecular weight of a copolymer to be obtained can be adjusted by the presence of hydrogen in the polymerization system or also by changing the polymerization temperature. Further, the molecular weight can be adjusted also by the amount of the compound (C) to be used. Specific examples thereof include triisobutyl aluminum, methylaluminoxane, and diethylzinc. In the case of adding hydrogen, the amount thereof is suitably about 0.001 to 100 NL per kg of olefin.

[Step C]

In addition to the step A and the step B described above, the method for producing the olefin resin of the present invention may include step C of recovering a polymer produced in each step after the step, as required. This step is a step of separating the organic solvent used in each polymerization step to extract a polymer and converting it into a product form. The step is not especially limited, as long as it is an existing step of producing an olefin resin, such as solvent concentration, extrusion degassing, and precipitation.

<Crosslinked Product>

The crosslinking method is not specifically limited, as long as it can utilize unsaturated bonds derived from the non-conjugated diene. Specifically, examples thereof include crosslinking using electron beam and crosslinking using a crosslinking agent, and crosslinking reaction using a crosslinking agent is particularly preferably used.

<Crosslinking Agent, Crosslinking Aid, Vulcanization Accelerator, and Vulcanization Aid>

Examples of the crosslinking agent include crosslinking agents generally used for crosslinking rubber. Specifically, examples thereof include peroxides, sulfur compounds, phenolic resins, amino resins, quinones or derivatives thereof, amine compounds, azo compounds, epoxy compounds, isocyanate compounds, and hydrosilicone compounds. Among these, sulfur compounds are preferable due to their difficulty in reducing the molecular weight and excellent reactivity with the olefin resin of the present invention obtained by using a non-conjugated diene with one vinyl end-group as a non-conjugated diene.

Examples of the peroxides include organic peroxides. Examples of the organic peroxides include dialkyl peroxides, diacyl peroxides, peroxyketals, peroxyesters, peroxycarbonates, peroxydicarbonates, ketone peroxides, and hydroperoxides. Specifically, examples thereof include dicumyl peroxide, tert-butylcumyl peroxide, di-tert-butyl peroxide, 2,5-di-(tert-butylperoxy)hexane, 2,5-dimethyl-2,5-di-(tert-butylperoxy)hexane, 2,5-dimethyl-2,5-di-(tert-butylperoxy)hexin-3, 1,3-bis(tert-butylperoxyisopropyl) benzene, benzoyl peroxide, p-chlorobenzoyl peroxide, 2,4-dichlorobenzoyl peroxide, lauroyl peroxide, diacetyl peroxide, 1,1-bis(tert-butylperoxy)-3,3,5-trimethylcyclohexane, n-butyl-4,4-bis(tert-butylperoxy) valerate, tert-butyl peroxybenzoate, and tert-butyl peroxyisopropyl carbonate.

In the case of using a peroxide as the crosslinking agent, the amount of the peroxide blended with the composition is generally 0.1 to 20 parts by mass, preferably 0.15 to 15 parts by mass, further preferably 0.15 to 10 parts by mass, with respect to a total of 100 parts by mass of the olefin resin. The amount of the peroxide within such a range enables a resulting crosslinked product with no bloom on the surface thereof and also allows the composition to exhibit excellent crosslinking properties.

In the case of using a peroxide as the crosslinking agent, a crosslinking aid is preferably used in combination.

Examples of the crosslinking aid include sulfur; quinone dioxime crosslinking aids such as p-quinone dioxime; acrylic crosslinking aids such as ethylene glycol dimethacrylate and trimethylolpropane trimethacrylate; allyl crosslinking aids such as diallyl phthalate and triallyl isocyanurate; maleimide crosslinking aids; divinyl benzene; and metal oxides such as zinc oxide (for example, ZnO #1/Type 2 zinc oxide, available from HAKUSUI TECH CO., LTD.), magnesium oxide, and zinc white (for example, zinc oxide such as "META-Z102" (product name; Inoue Calcium Corporation)).

In the case of using such a crosslinking aid, the amount thereof is generally 0 to 15 parts by mass, preferably 0.1 to 10 parts by mass, with respect to a total of 100 parts by mass of the olefin resin. Examples of the sulfur compounds (vulcanizing agents) include sulfur, sulfur chloride, sulfur dichloride, morpholine disulfide, alkylphenol disulfide, tetramethylthiuram disulfide, and selenium dithiocarbamate.

In the case of using a sulfur compound as the crosslinking agent, the amount thereof is generally 0.3 to 10 parts by mass, preferably 0.5 to 7.0 parts by mass, further preferably 0.7 to 5.0 parts by mass, with respect to a total of 100 parts by mass of the olefin resin. The amount of the sulfur compound within such a range enables a resulting crosslinked product with no bloom on the surface thereof and also allows the composition to exhibit excellent crosslinking properties.

In the case of using a sulfur compound as the crosslinking agent, a vulcanization accelerator is preferably used in combination. Examples of the vulcanization accelerator include thiazole vulcanization accelerators, guanidine vulcanization accelerators, aldehyde amine vulcanization accelerators, imidazoline vulcanization accelerators, thiuram vulcanization accelerators, dithioate vulcanization accelerators, thiourea vulcanization accelerators, and xanthate vulcanization accelerators.

In the case of using a vulcanization accelerator, the amount of the vulcanization accelerator blended with the composition is generally 0.1 to 20 parts by mass, preferably 0.2 to 15 parts by mass, further preferably 0.5 to 10 parts by mass, with respect to a total of 100 parts by mass of the olefin resin. The amount of the vulcanization accelerator within such a range enables a resulting crosslinked product with no bloom on the surface thereof and also allows the composition to exhibit excellent crosslinking properties.

In the case of using a sulfur compound as the crosslinking agent, a vulcanization aid can be used in combination. Examples of the vulcanization aid include zinc oxide, magnesium oxide, and zinc white. In the case of using a vulcanization aid, the amount of the vulcanization aid blended with the composition is generally 1 to 20 parts by mass with respect to a total of 100 parts by mass of the olefin resin.

A crosslinking reaction using the crosslinking agent proceeds by reaction of the unsaturated group introduced into a polymer chain. A crosslinked structure may be formed by the polymerization reaction in the step B in the case of using a diene containing two vinyl groups. For example, a crosslinked product may be formed in the step B, using a polymer containing vinyl groups at both chain ends as a non-conjugated diene. That is, in the case of using a non-conjugated diene having a polymer structure, such as a polyolefin copolymer having vinyl groups at both chain ends as a non-conjugated diene, as described above, a crosslinked product may be formed in the step B.

<Other Additives>

The olefin resin of the present invention and its crosslinked product can be used by adding thereto various additives for resins as exemplified below.

<Softeners>

Examples of softeners include petroleum softeners such as process oil, lubricating oil, paraffin oil, liquid paraffin, petroleum asphalt, and vaseline; coal tar softeners such as coal tar; fat oil softeners such as castor oil, linseed oil, rapeseed oil, soybean oil, and coconut oil; waxes such as beeswax and carnaubaro; naphthene acid, pine oil, rosin, or derivatives thereof; synthetic polymer materials such as terpene resin, petroleum resin, and coumarone indene resin; ester softeners such as dioctyl phthalate and dioctyl adipate; and others such as microcrystalline waxes, liquid polybutadiene, modified liquid polybutadiene, hydrocarbon synthetic lubricating oil, tall oil, and sub(factice). Among these, petroleum softeners are preferable, and process oil is particularly preferable.

In the case of using a softener, the amount of the softener is generally 2 to 100 parts by mass, preferably 10 to 100 parts by mass, with respect to a total of 100 parts by mass of the olefin resin.

<Inorganic Fillers>

Examples of inorganic fillers include light calcium carbonate, heavy calcium carbonate, talc, and clay.

In the case of using an inorganic filler, the amount of the inorganic filler is generally 2 to 100 parts by mass, preferably 5 to 100 parts by mass, with respect to a total of 100 parts by mass of the olefin resin. Within such a range of the amount of the inorganic filler, a crosslinked product with excellent kneading processability and excellent mechanical properties can be obtained.

<Reinforcers>

Examples of reinforcers include carbon black, carbon black surface-treated with a silane coupling agent, silica, calcium carbonate, activated calcium carbonate, fine talc, and fine silicic acid.

In the case of using a reinforcer, the amount of the reinforcer is generally 5 to 300 parts by mass, preferably 10 to 100 parts by mass, with respect to a total of 100 parts by mass of the olefin resin.

<Anti-Aging Agents (Stabilizers)>

Blending an anti-aging agent (stabilizer) thereto can impart an extended lifetime to a crosslinked product to be formed. Examples of such an anti-aging agent include conventionally known anti-aging agents such as amine anti-aging agents, phenolic anti-aging agents, and sulfur anti-aging agents.

In the case of using an anti-aging agent, the amount of the anti-aging agent is generally 0.3 to 10 parts by mass, preferably 0.5 to 7.0 parts by mass, with respect to a total of 100 parts by mass of the olefin resin. The amount of the anti-aging agent within such a range enables a resulting crosslinked product with no bloom on the surface thereof and further can suppress vulcanization inhibition.

<Processing Aids>

As processing aids, those generally contained in rubber as processing aids can be widely used. Examples of the processing aids include fatty acids such as ricinoleic acid, stearic acid, palmitic acid, and lauric acid, fatty acid salts such as barium stearate, zinc stearate, and calcium stearate, fatty acid esters such as ricinoleic acid ester, stearic acid ester, palmitic acid ester, and lauric acid ester, and fatty acid derivatives such as N-substituted fatty acid amide. Among these, stearic acid is preferable.

In the case of using a processing aid, the amount of the processing aid is generally 10 parts by mass or less, preferably 8.0 parts by mass or less, with respect to a total of 100 parts by mass of the olefin resin.

<Activators>

Examples of activators include amines such as di-n-butylamine, dicyclohexylamine, and monoethanolamine; activators such as diethylene glycol, polyethylene glycol, lecithin, triarylate melilate, and zinc compounds of aliphatic carboxylic acid or aromatic carboxylic acid; zinc peroxide modifiers; and octadecyltrimethylammonium bromide, synthetic hydrotalcite, and special quaternary ammonium compounds.

In the case of using an activator, the amount of the activator is generally 0.2 to 10 parts by mass, preferably 0.3 to 5 parts by mass, with respect to a total of 100 parts by mass of the olefin resin.

<Moisture Absorbents>

Examples of moisture absorbents include calcium oxide, silica gel, sodium sulfate, molecular sieve, zeolite, and white carbon.

In the case of containing a moisture absorbent, the amount of the moisture absorbent is generally 0.5 to 15 parts by mass, preferably 1.0 to 12 parts by mass, with respect to a total of 100 parts by mass of the olefin resin.

<Foaming Agents>

The crosslinked product of the present invention may be a non-foamed product or a foamed product. A foaming agent can be used when forming a foam, and examples thereof include inorganic foaming agents such as sodium bicarbonate, sodium carbonate, ammonium bicarbonate, ammonium carbonate, and ammonium nitrite; nitroso compounds such as N,N'-dinitroterephthalamide and N,N'-dinitrosopentamethylenetetramine; azo compounds such as azodicarbonamide, azobisisobutyronitrile, azocyclohexylnitrile, azodiaminobenzene, and barium azodicarboxylate; sulfonyl hydrazide compounds such as benzene sulfonyl hydrazide, toluene sulfonyl hydrazide, and p,p'-oxybis(benzene sulfonyl hydrazide)diphenyl sulfone-3,3'-disulfenyl hydrazide; and azide compounds such as calcium azide, 4,4'-diphenyl sulfonyl azide, and paratoluenesulfonyl azide.

In the case of using a foaming agent, the amount of the foaming agent is appropriately selected so that the specific gravity of the foam after crosslinking and foaming is generally 0.01 to 0.9. The content of the foaming agent is generally 0.5 to 30 parts by mass, preferably 1 to 20 parts by mass, with respect to a total of 100 parts by mass of the olefin resin.

EXAMPLES

Hereinafter, the present invention will be described further specifically by way of examples, but the present invention is not limited to these examples.

In the following examples, the physical properties were measured or evaluated by the following methods.

<Structural Analysis of Polymers>

The polymer structures of the resins described in the examples were analyzed by the following methods.

(Measuring Device)

Nuclear magnetic resonance device, type ECX400P, available from JEOL Ltd.

Measurement nucleus: $^1$H (400 MHz)

(Measurement conditions)

Measurement mode: Single pulse

Pulse width: 45° (5.25 μseconds)

Number of points: 32 k

Measurement range: 20 ppm (−4 to 16 ppm)

Repetition time: 7.0 seconds

Cumulative number of times: 256 times

Measurement solvent: Orthodichlorobenzene-d4

Sample concentration: ca. 20 mg/0.6 mL

Measurement temperature: 120° C.
Window function: Exponential (BF: 0.12 Hz)
Chemical shift criteria: Orthodichlorobenzene (7.1 ppm)
(Vinyl Termination Ratio of Macromonomer)

The polymer composition and the vinyl termination ratio of each macromonomer can be analyzed from $^1$H-NMR spectra, and the compositional ratio of ethylene to propylene is calculated by conventional method. Here, the vinyl termination ratio is the content of vinyl groups (unit: mol %) in all unsaturated end-groups and is calculated from the percentage.

(Quantification of Non-Conjugated Diene)

The introduction of the non-conjugated diene comonomer into the copolymer described in the following examples can be confirmed from signals of unsaturated bonds observed in $^1$H-NMR spectra.

<GPC Measurement>

The weight-average molecular weight and the molecular weight distribution of the copolymer described in the examples is measured by the following method.

(Pretreatment of Sample)

30 mg of each resin produced in the examples is dissolved in 20 ml of o-dichlorobenzene at 145° C. Then, the solution is filtered with a sintered filter having a pore size of 1.0 µm, and the filtrate is used as an analysis sample.

(GPC Analysis)

Using gel permeation chromatography (GPC), the weight-average molecular weight (Mw), the number-average molecular weight (Mn), and the molecular weight distribution curve are determined. The calculation is performed in terms of polystyrene. The ratio Mw/Mn is calculated from the weight-average molecular weight (Mw) and the number-average molecular weight (Mn) determined.

(Measuring Device)
Gel permeation chromatograph, type HLC-8321 GPC/HT (available from Tosoh Corporation)
(Analyzer)
Data processing software Empower 2 (available from Waters Corporation, registered trademark)
(Measurement Conditions)
Columns: Two columns of TSKgel GMH$_6$-HT and two columns of TSKgel GMH$_6$-HTL (all with diameter 7.5 mm×length 30 cm, available from Tosoh Corporation)
Column temperature: 140° C.
Mobile phase: o-Dichlorobenzene (containing 0.025% BHT)
Detector: Differential refractometer
Flow rate: 1 mL/minute
Sample concentration: 0.15% (w/v)
Injection volume: 0.4 mL
Time interval of sampling: 1 second
Column calibration: Monodisperse polystyrene (available from Tosoh Corporation)
Molecular weight conversion: PS conversion/standard conversion method
(Confirmation of Production of Copolymer of Macromonomer with 7-Methyl-1,6-Octadiene)

The production of a copolymer of a macromonomer with 7-methyl-1,6-octadiene can be confirmed by a peak observed on the higher molecular weight side than that of the macromonomer as a starting material in the chromatogram obtained by GPC. The amount of the copolymer of the macromonomer with 7-methyl-1,6-octadiene produced was investigated by separating the peak by waveform analysis. The same applies to the case of the copolymer of the macromonomer with the ethylene-propylene copolymer containing vinyl groups at both chain ends (non-conjugated diene).

<Evaluation of Crosslinkability of Olefin Resin>

Using the uncrosslinked olefin resin in each of Examples and Comparative Example, a cure meter test was performed under measurement conditions at a temperature 160° C. for 20 minutes by a measuring device: MDR2000P (available from ALPHA TECHNOLOGIES), and a value S'Max–S'Min was measured as follows.

A sample was set in the measuring device, and changes in torque obtained under conditions at a constant temperature and a constant shear rate were measured, to obtain a vulcanization curve. From the vulcanization curve, the minimum value S'Min and the maximum value S'Max of the torque were determined, and the progress of crosslinking was investigated by the degree of increase in torque.

<Production of Olefin Resin>

Example 1

Step A: Production of Ethylene-Propylene Copolymer macromonomer

Dimethylsilylbis(2-methyl-4-phenylindenyl)hafnium dichloride used as a catalyst was synthesized by a known method.

After 500 ml of xylene was put into a glass reactor with an internal volume of 1.0 L sufficiently purged with nitrogen, ethylene and propylene were continuously supplied respectively at 120 liters/hr and 53 liters/hr, while the inside of a polymerizer was maintained at 95° C. under stirring at 600 rpm, to saturate the liquid phase and the vapor phase. Subsequently, while ethylene and propylene were being continuously supplied, 4.0 mL (4.0 mmol) of a solution of triisobutyl aluminum in toluene (1.0 mol/L), 4.0 mL (0.020 mmol) of a solution of dimethylsilylbis(2-methyl-4-phenyl indenyl)hafnium dichloride in toluene (0.005 mol/L), and then 8.0 mL (0.080 mmol) of a solution of triphenylcarbenium tetrakis(pentafluorophenyl) borate (which may be also referred to as Ph$_3$CB(C$_6$F$_5$)$_4$) in toluene (10 mmol/L) were added thereto, to perform polymerization at 95° C. for 10 minutes under normal pressure. The polymerization was terminated by adding a small amount of isobutanol. The polymerization reaction solution obtained was washed with dilute hydrochloric acid, followed by liquid separation, and the solvent of an organic layer obtained was distilled off under reduced pressure, to obtain an ethylene-propylene copolymer macromonomer. The copolymer was dried at 130° C. for 10 hours under reduced pressure, to obtain 8.2 g of a macromonomer.

The properties of the copolymer macromonomer obtained were as follows: Mw=11,700, Mn=4,070, Mw/Mn=2.87, ethylene content=48 mol %, and vinyl termination ratio=86.8 mol %.

Step B: Copolymerization of Olefin Macromonomer with Non-Conjugated Diene

A compound (1) represented by the formula below used as a catalyst was synthesized by a known method.

Compound (I)

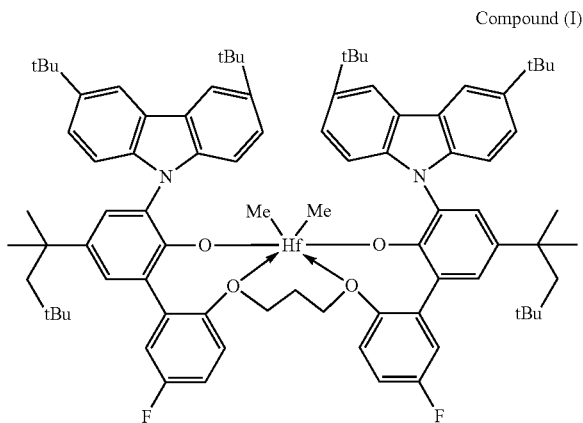

Under a nitrogen atmosphere, 3.0 g of the macromonomer synthesized in the step A was dissolved in 6.0 mL of toluene in a 30-mL Schlenk tube, followed by degassing with nitrogen for 15 minutes and then heating to 50° C. 0.5 mL (0.3 mmol) of a solution of 7-methyl-1,6-octadiene in toluene (0.6 mol/L), 4.0 mL (4.0 mmol) of a solution of triisobutyl aluminum in toluene (1.0 mol/L), 4.0 mL (0.020 mmol) of a solution of the compound (1) in toluene (0.005 mol/L), and 8.0 mL (0.080 mmol) of a solution of triphenylcarbenium tetrakis(pentafluorophenyl) borate (which may be also referred to as $Ph_3CB(C_6F_5)_4$) in toluene (10 mmol/L) were sequentially added thereto, to perform polymerization at 50° C. for 30 minutes under normal pressure. The polymerization was terminated by adding a small amount of isobutanol. The polymerization reaction solution obtained was subjected to precipitation in a large amount of methanol, to obtain an olefin resin. The olefin resin was dried at 130° C. for 10 hours under reduced pressure, to obtain 2.8 g of olefin resin. The properties of the olefin resin were as follows: Mw=14,000, Mn=5,260, and Mw/Mn=2.67. Further, the proportion of the copolymer of the macromonomer with 7-methyl-1,6-octadiene in the olefin resin was calculated to be 5.3 mass % from the peak separation by GPC analysis. Further, the content of structural units derived from the macromonomer in the copolymer of the macromonomer with 7-methyl-1,6-octadiene was 98.5 mol %.

Example 2

Step B: Copolymerization of Olefin Macromonomer with Non-Conjugated Diene

Under a nitrogen atmosphere, 3.0 g of the macromonomer synthesized in the step A of Example 1 was dissolved in 6.0 mL of toluene in a glass reactor with an internal volume of 100 mL, followed by degassing with nitrogen for 15 minutes and then heating to 50° C. 0.5 mL (0.3 mmol) of a solution of 7-methyl-1,6-octadiene in toluene (0.6 mol/L), 6.0 mL (6.0 mmol) of a solution of triisobutyl aluminum in toluene (1.0 mol/L), 8.0 mL (0.040 mmol) of a solution of the compound (1) in toluene (0.005 mol/L), and 16.0 mL (0.160 mmol) of a solution of triphenylcarbenium tetrakis(pentafluorophenyl) borate (which may be also referred to as $Ph_3CB(C_6F_5)_4$) in toluene (10 mmol/L) were sequentially added thereto, to perform polymerization at 50° C. for 60 minutes under normal pressure. The polymerization was terminated by adding a small amount of isobutanol. The polymerization reaction solution obtained was subjected to precipitation in a large amount of methanol, to obtain an olefin resin. The olefin resin was dried at 130° C. for 10 hours under reduced pressure, to obtain 2.9 g of olefin resin. The properties of the olefin resin were as follows: Mw=19,000, Mn=7,300, and Mw/Mn=2.60. Further, the proportion of the copolymer of the macromonomer with 7-methyl-1,6-octadiene was calculated to be 17.0 mass % from the peak separation by GPC analysis. Further, the content of structural units derived from the macromonomer in the copolymer of the macromonomer with 7-methyl-1,6-octadiene was 98.3 mol %.

Example 3

An ethylene-propylene copolymer containing vinyl groups at both chain ends was obtained in the same manner as in Example 1 of WO 2008/026628. Specifically, the composition of the polyolefin polymer containing vinyl groups at both chain ends obtained had an ethylene content of 79.8 mol %, a propylene content of 16.6 mol %, a 1,3-butadiene content of 3.6 mol %, wherein the breakdown of 1,3-butadiene included 0.6 mol % of a 1,4-addition structure, 0.5 mol % of a 1,2-addition structure, 2.3 mol % of a 5-membered ring structure, and 0.2 mol % of a 3-membered ring structure. The polymer had a vinyl termination ratio of 77% and an intrinsic viscosity [η] of 0.12 dl/g. This was used as a non-conjugated diene in step B below.

Step B: Copolymerization of Olefin Macromonomer with Non-Conjugated Diene

Subsequently, 3.0 g of a macromonomer synthesized by the same operation as in Example 1 (Mw=12,200, Mn=4,070, Mw/Mn=3.00, ethylene content=49 mol %, and vinyl termination ratio=85.5 mol %) and 0.2 g of the ethylene-propylene copolymer containing vinyl groups at both chain ends (non-conjugated diene) were dissolved in 6.0 mL of toluene in a glass reactor with an internal volume of 100 mL under a nitrogen atmosphere, followed by degassing with nitrogen for 15 minutes and then heating to 50° C. 6.0 mL (6.0 mmol) of a solution of triisobutyl aluminum in toluene (1.0 mol/L), 8.0 mL (0.040 mmol) of a solution of the compound (1) in toluene (0.005 mol/L), and 16.0 mL (0.160 mmol) of a solution of triphenylcarbenium tetrakis(pentafluorophenyl) borate (which may be also referred to as $Ph_3CB(C_6F_5)_4$) in toluene (10 mmol/L) were sequentially added thereto, to perform polymerization at 50° C. for 60 minutes under normal pressure. The polymerization was terminated by adding a small amount of isobutanol. The polymerization reaction solution obtained was subjected to precipitation in a large amount of methanol, to obtain an olefin resin. The olefin resin was dried at 130° C. for 10 hours under reduced pressure, to obtain 3.1 g of olefin resin. The properties of the olefin resin were as follows: Mw=21,000, Mn=7,400, and Mw/Mn=2.83. Further, the proportion of the copolymer of the macromonomer with the ethylene-propylene copolymer containing vinyl groups at both chain ends (non-conjugated diene) was calculated to be 15.5 mass % from the peak separation by GPC analysis.
<Evaluation of Crosslinkability>

Example 4

100 parts by mass of the olefin resin obtained in Example 2 above was mixed with 5 parts by mass of "Type 2 zinc oxide" (product name; available from Sakai Chemical Industry Co., Ltd.) as a vulcanization aid and 1 part by mass of stearic acid as a processing aid. Thereafter, 2 parts by mass of 2-mercaptobenzothiazole (Sanceler M: available from SANSHIN CHEMICAL INDUSTRY CO., LTD.) as a vulcanization accelerator, 4 parts by mass of tetramethylthiuram disulfide (Sanceler TT: available from SANSHIN CHEMICAL INDUSTRY CO., LTD.) as a vulcanization accelerator, and 6 parts by mass of powder sulfur as a crosslinking agent were mixed therewith, to cause a reaction at a temperature of 160° C. for 20 minutes using MDR2000P. The value S'Max–S'Min was 0.06 N·m.

Comparative Example 1

An olefin resin was obtained in the same manner as in Example 2 except that 7-methyl-1,6-octadiene was not added. The properties of the olefin resin were as follows: Mw=37,900, Mn=8,150, and Mw/Mn=4.65. Further, the proportion of the macromonomer polymer was calculated to be 30.6 mass % from the peak separation by GPC analysis.

100 parts by mass of the olefin resin obtained was mixed with 5 parts by mass of "Type 2 zinc oxide" (product name; available from Sakai Chemical Industry Co., Ltd.) as a vulcanization aid and 1 part by mass of stearic acid as a processing aid. Thereafter, 2 parts by mass of 2-mercaptobenzothiazole (Sanceler M: available from SANSHIN CHEMICAL INDUSTRY CO., LTD.) as a vulcanization accelerator, 4 parts by mass of tetramethylthiuram disulfide (Sanceler TT: available from SANSHIN CHEMICAL INDUSTRY CO., LTD.) as a vulcanization accelerator, and 6 parts by mass of powder sulfur as a crosslinking agent were mixed therewith, to cause a reaction at a temperature of 160° C. for 20 minutes using MDR2000P. The value S'Max–S'Min was 0.02 N·m.

From Example 4 and Comparative Example 1, it is considered that the crosslinking reaction of the olefin resin of the present invention had proceeded.

INDUSTRIAL APPLICABILITY

The olefin resin of the present invention can provide a crosslinked product with excellent mechanical properties by crosslinking reaction. Accordingly, the olefin resin of the present invention and its crosslinked product can be expected to be applied as materials, shaped products, and multilayer laminates used in various fields such as electrical/electronic parts/transportation machinery, civil engineering/construction, building materials, medical care, leisure, and packaging.

The invention claimed is:
1. An olefin resin comprising a copolymer of an olefin macromonomer with a non-conjugated diene,
   wherein the non-conjugated diene is selected from chain dienes, cyclic dienes, and a polyolefin polymer containing vinyl groups at both chain ends which contains constituent units derived from at least one selected from the group consisting of ethylene (a), α-olefins having 3 to 20 carbon atoms (b), and cyclic olefins (c) represented by formulas [I], [II], and [III] below, wherein
      1) the vinyl termination ratio to both chain ends of all molecular chains is 70% or more, and
      2) the intrinsic viscosity [η] measured in a decalin solution at 135° C. is in a range of 0.01 to 10 dl/g,

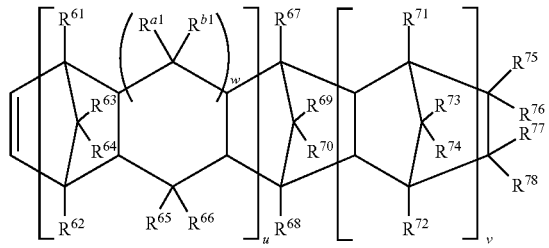

wherein u is 0 or 1, v is 0 or an integer of 1 or more, w is 0 or 1, $R^{61}$ to $R^{78}$, $R^{a1}$, and $R^{b1}$ may be the same or different from each other and are each a hydrogen atom, a halogen atom, or a hydrocarbon group, $R^{75}$ to $R^{78}$ may be bonded to each other to form a monocyclic or polycyclic ring, the monocyclic or polycyclic ring may have a double bond, and $R^{75}$ and $R^{76}$, or $R^{77}$ and $R^{78}$ may form an alkylidene group,

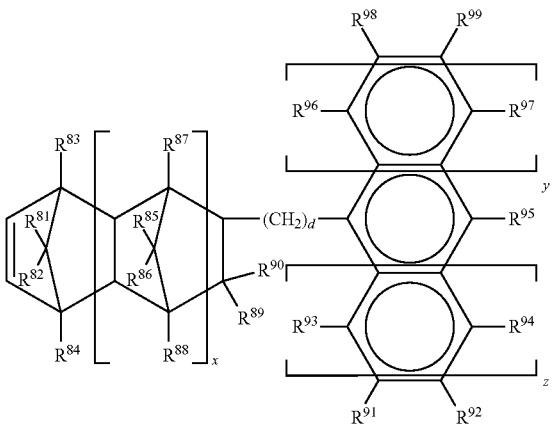

wherein x and d are each 0 or an integer of 1 or more, y and z are each 0, 1, or 2, $R^{81}$ to $R^{99}$ may be the same or different from each other and are each a hydrogen atom, a halogen atom, an aliphatic hydrocarbon group, an aromatic hydrocarbon group, or an alkoxy group, the carbon atom to which $R^{89}$ and $R^{90}$ are bonded and the carbon atom to which $R^{93}$ is bonded or the carbon atom to which $R^{91}$ is bonded may be bonded directly or via an alkylene group having 1 to 3 carbon atoms, and $R^{95}$ and $R^{92}$, or $R^{95}$ and $R^{99}$ may be bonded to each other to form a monocyclic or polycyclic aromatic ring when y=z=0 is satisfied,

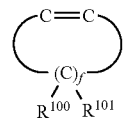

wherein $R^{100}$ and $R^{101}$ may be the same or different from each other and are each a hydrogen atom or a hydrocarbon group having 1 to 5 carbon atoms, and f is an integer of 1≤f≤18, and wherein the copolymer is free from comonomers other than the olefin macromonomer and the non-conjugated diene.

2. The olefin resin according to claim 1, wherein the copolymer of the olefin macromonomer with the non-conjugated diene has a content of structural units derived from the olefin macromonomer in a range of 80 to 99.5 mol %.

3. The olefin resin according to claim 1, wherein the olefin macromonomer satisfies requirements (i) to (iii) below:
  (i) the olefin macromonomer is a homopolymer or a copolymer of one or more olefins selected from ethylene and a-olefins having 3 to 12 carbon atoms;
  (ii) the olefin macromonomer has a weight-average molecular weight in a range of 1,000 to 30,000; and
  (iii) the olefin macromonomer has vinyl groups in an amount of 50 mol % or more with respect to all unsaturated end-groups.

4. The olefin resin according to claim 3, wherein the requirement (i) is that the olefin macromonomer is a copolymer of ethylene with one or more α-olefins having 3 to 12 carbon atoms, wherein a content of repeating units derived from ethylene is in a range of 30 to 70 mol %.

5. The olefin resin according to claim 3, wherein the requirement (iii) is that the olefin macromonomer has vinyl groups in an amount of 60 mol % or more with respect to the all unsaturated end-groups.

6. A method for producing the olefin resin according to claim 1, comprising step A and step B below:
  step A: a step of producing an olefin macromonomer by polymerizing an olefin in the presence of an olefin polymerization catalyst; and
  step B: a step of producing an olefin resin by copolymerizing the olefin macromonomer produced in the step A with a non-conjugated diene in the presence of an olefin polymerization catalyst.

7. A crosslinked product of the olefin resin according to claim 1.

8. A method for producing a crosslinked product, comprising crosslinking an olefin resin obtained by the method according to claim 6 using a crosslinking agent.

* * * * *